March 6, 1951  A. F. GIBSON  2,544,261
INFRARED SENSITIVE CELL
Filed Nov. 3, 1949

ALAN FRANK GIBSON
Inventor

By Roberts B. Larson
Attorney

Patented Mar. 6, 1951

2,544,261

UNITED STATES PATENT OFFICE 2,544,261

INFRARED SENSITIVE CELL

Alan F. Gibson, Malvern Link, England

Application November 3, 1949, Serial No. 125,363
In Great Britain November 11, 1948

12 Claims. (Cl. 201—63)

1

The present invention relates to radiation sensitive cells more particularly those sensitive to radiations at infra-red wavelengths and has for its object to provide expedients for improving the sensitivity of such cells.

A type of cell employed for the detection of infra-red radiations comprises a pair of electrodes formed by painting, spraying, sputtering or otherwise forming spaced conductive coatings on a glass surface forming the end wall of a tubular support, the space between the electrodes being coated with a layer of lead sulphide, lead selenide or other substance which exhibits the property of changing its electrical resistance under the action of radiations at infra-red wavelengths.

The tube, on the end wall of which the structure above described is mounted, is made the inner vessel of a double-walled glass structure the outer shell of which is closed by a window which lies over the end face of the inner tube carrying the sensitive layer. At the other end the two glass vessels are fused together, leads from the eectrodes being passed out through the fused region. The space between the two glass bodies is evacuated.

In such a cell the conductivity of the sensitive layer increases with the intensity of incident illumination according to a curve which rises steeply at low illumination intensities, the slope falling off progressively as higher levels of illumination are reached. It will be understood, therefore, that the sensitivity of the cell to small changes in illumination intensity is greatest in the region of minimum total illumination intensities and it is therefore desirable to operate the cell at the lowest possible level of incident illumination. Since the radiations to which the cell is sensitive are those in the infra-red region, reduction of incident illumination means in effect reduction of heat radiation towards the sensitive layer and it has been discovered that in cells of high sensitivity radiation from the inner wall of the outer shell of the cell envelope accounts for a large proportion of the incident illumination on the sensitive layer, and constitutes a limiting factor which must be removed before the sensitivity of the cell can be improved. This radiation could be reduced by cooling the walls of the cell outer shell but this expedient is not practical since it results in the formation of frost on the outer cell walls and, since the frost so formed is substantially opaque to infra-red radiations, the formation of frost on the window through which the radiations to be detected must pass, cannot be tolerated.

One object of the present invention is to extend the range of wavelengths in the infra-red region to which a radiation sensitive cell may be made to respond.

A further object of the invention is to provide a radiation-sensitive cell sensitive to radiations in the infra-red wavelength region in which unwanted radiations incident on the sensitive layer are reduced or minimised.

According to the present invention in one aspect, therefore, in a radiation sensitive cell of the kind described above, in which a radiation sensitive layer is exposed through a wall of an evacuated envelope which encloses the sensitive layer, radiation from the wall of the enclosing envelope is minimised by forming the inner surface of said wall, at least over those parts so located as to radiate towards the sensitive layer, as a mirror surface, by providing thereon a mirror coating, for example of silver or aluminum, an aperture being left or formed in the mirror surface, of suitable size and shape to provide a window giving access to the sensitive layer for the radiations to be detected.

According to a feature of the invention, unwanted radiations from the envelope of a radiation sensitive cell towards a radiation sensitive layer provided in said envelope is reduced by surrounding the sensitive layer with a masking wall or walls so constructed that the sensitive layer lies in the shadow of said wall or walls except for radiations incident from the direction of incidence of the radiations to be detected.

According to another aspect of the invention the two expedients outlined in the two preceding paragraphs are provided in combination, the size of the clear window formed in the mirror surface being suitably related to the area enclosed by the masking wall or walls to provide a satisfactory screening of the sensitive layer from radiations other than those incident through said window.

In high sensitivity cells of the kind to which this invention relates it is usual, in order to obtain the desired high sensitivity, to cool the sensitive layer by introducing a coolant such as solid carbondioxide or liquid oxygen into the hollow space within the inner vessel, the coolant being insulated against heat exchange with its surroundings by the evacuated envelope of the cell. It will be understood that, unless this expedient is adopted, or radiation from the inner vessel through the evacuated space towards the outer shell is otherwise reduced, the provision of a mirror surface in the manner above set forth may not be effective since it would serve merely to reflect such radiations back towards the sensitive layer.

In order that the invention may be more clearly understood, some embodiments thereof will now be described with reference to the accompanying drawings in which.

Figure 1:
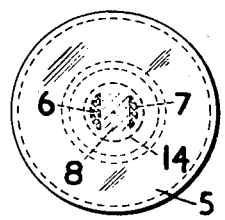
Fig. 1 is an end view of a cell constructed according to the invention.
Figure 2:
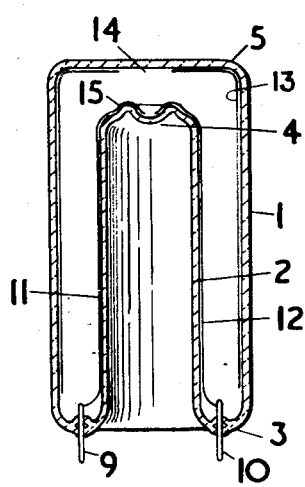
Fig. 2 is a sectional elevation of the cell shown in Fig. 1.

Referring first to Figs. 1 and 2 the cell shown comprises a glass envelope in the form of two concentric tubes 1 and 2 supported in concentric relation by being fused together at their lower ends 3. The inner tube 2 is closed at its upper end by a generally flat end wall 4, the configuration of which will be further discussed below, which carries on its upper surface (the surface inside the space between the two parts of the envelope) a radiation sensitive layer and electrodes connecting thereto all of which will be further described below. The upper end of the outer shell of the envelope 1 is likewise closed by the flat end wall 5. The space between the inner and outer shells is evacuated.

The arrangement on the end wall 4 of the inner tube 2 is best seen from the end view of Fig. 1 which shows two electrodes 6 and 7, which may be formed on the glass surface by plating, sputtering or painting metallic or other conducting material on to the glass surface, and between these electrodes is a coating, shown by cross hatching 8 of radiation sensitive material such as lead sulphide, lead selenide, lead teluride or other substance according to the wavelength of the radiations to which the tube is required to be sensitive.

The electrodes 6 and 7 are connected to contact pins 9 and 10 sealed into the wall of the glass envelope at its lower end, the connection being made by way of two leads 11 and 12 which pass down the outer surface of the tube 2.

In accordance with the invention, radiation of infra-red waves inwardly from the inner surface of tube 1 and more particularly the end wall 5 thereof is substantially reduced by providing on this wall a mirror coating 13 which extends over the whole of the side wall and across the end wall 5, with the exception of a small window 14 located opposite the sensitive layer on the end 4 of the inner tube 2. The window 14 may be made either by masking the tube wall during the silvering process or by applying a mirror coating to the whole of the wall surface and removing the area of the coating covering the window by any suitable process, for example by means of a suitable buffing tool.

The inward radiation from the walls of the outer tube 1 which has the greatest effect upon the sensitive layer has been found to come mainly from the end wall 5. Accordingly, as a further expedient according to the invention, the end wall 4 of the inner tube 2 may be provided with masking walls adapted to shade the sensitive area from such radiations except those entering through the central portion of the end wall, for example through the window 14. One arrangement which may be adopted for this purpose is shown in Fig. 2 in which the end wall 4 of tube 2 is shown provided with a raised circular bead 15 formed by moulding or blowing as a distortion of the end wall 4. This bead will serve to reduce the sideways radiation reaching the sensitive layer. It has been stated above that a device of the kind to which this invention relates may be used with a cooling agent in the central cavity, that is the cavity within tube 2. The bead 15 is shown produced as a distortion of the end wall 4 of tube 2 rather than as a bead laid on the surface of this wall so that the wall is not thickened by the bead and the cooling agent may therefore have full effect in the vicinity of the sensitivity layer.

Figure 3:
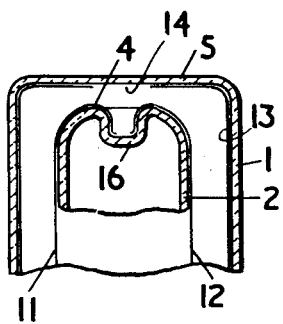
Fig. 3 is a partial section of an alternative form of cell according to the invention.
Figure 4:
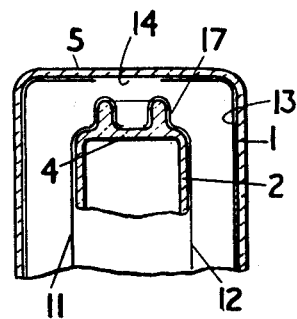
Fig. 4 is a similar partial sectional view of a further possible form.

Other forms which the masking wall surrounding the sensitive layer may take are shown in Figs. 3 and 4.

In Fig. 3 the end wall 4 of the inner tube 2 is shown provided with a re-entrant well 16 at the bottom of which the sensitive layer is formed. It will be apparent that in this arrangement the sensitive layer is screened from all radiations other than those entering in directions substantially parallel to the axis of the well 16.

Fig. 4 shows another possible arrangement employing a masking wall surrounding the sensitive layer. In this case the wall is formed from a short tube or ring 17 of glass protruding from the upper surface of the end wall 4 thus forming a deep cup or well at the bottom of which the sensitive layer is formed. The contact electrodes and the leads connected thereto pass up the inner surface of the tube 17 over its edge and down the outer surface passing thence down the outer surface of tube 2 to the usual connecting pins at the base.

It will be apparent that many variations are possible in the form of masking wall employed in carrying out this aspect of the invention. Moreover the provisions of a mirror coating on the inner surface of the outer shell, although shown in all the examples, is not necessarily required in addition to the provision of a masking wall. The two expedients may, however, be used in conjunction with advantage, the size of the window left in the mirror coating suitably chosen in relation to the size of the aperture enclosed by the masking wall.

I claim:

1. Radiation-sensitive cell comprising an envelope having an outer tubular shell closed at one end by a window transparent to radiations in the infra-red wavelength region, an inner tubular shell lying within and spaced from said outer tubular shell and closed at the end adjacent to said window by an end wall and a closure sealing the annular space between the ends of said shells remote from said window, a radiation-sensitive layer formed on the surface of the end wall of said inner tubular shell adjacent said window, electrodes connecting with said layer, leads affording connection between said electrodes and contacts outside said envelope, and a mirror surface layer covering the inner surface of said outer tubular shell over a region extending from the boundaries of said window towards said closure at least beyond the surface supporting said radiation-sensitive layer.

2. Radiation-sensitive cell comprising an envelope having an outer tubular shell closed at one end by a window transparent to radiations in the infra-red wavelength region, an inner tubular shell lying within and spaced from said outer tubular shell and closed at the end adjacent to said window by an end wall and a closure sealing the annular space between the ends of said shells remote from said window, a radiation-sensitive layer formed on the surface of the end wall of said inner tubular shell adjacent said window, electrodes connecting with said layer, leads affording connection between said electrodes and contacts outside said envelope, the end wall of said inner tubular shell comprising a supporting surface for said layer and a shield wall surrounding said supporting surface and protruding therefrom towards said window.

3. Radiation-sensitive cell comprising an envelope having an outer tubular shell closed at one end by a window transparent to radiations in the infra-red wavelength region, an inner tubular shell lying within and spaced from said outer tubular shell and closed at the end adjacent to said window by an end wall and a closure sealing the annular space between the ends of said shells remote from said window, a radiation-sensitive layer formed on the surface of the end wall of said inner tubular shell adjacent said window, electrodes connecting with said layer, leads affording connection between said electrodes and contacts outside said envelope, the end wall of said inner tubular shell comprising a supporting surface for said layer and a beading formed on said end wall around said supporting surface, protuberant towards said window.

4. Radiation-sensitive cell comprising an envelope having an outer tubular shell closed at one end by a window transparent to radiations in the infra-red wavelength region, an inner tubular shell lying within and spaced from said outer tubular shell and closed at the end adjacent to said window by an end wall and a closure sealing the annular space between the ends of said shells remote from said window, a radiation-sensitive layer formed on the surface of the end wall of said inner tubular shell adjacent said window, electrodes connecting with said layer, leads affording connection between said electrodes and contacts outside said envelope, the end wall of said inner tubular shell being provided with a central indentation on the recessed surface of which said radiation-sensitive layer is formed.

5. Radiation-sensitive cell comprising an envelope having an outer tubular shell closed at one end by a window transparent to radiations in the infra-red wavelength region, an inner tubular shell lying within and spaced from said outer tubular shell and closed at the end adjacent to said window by an end wall and a closure sealing the annular space between the ends of said shells remote from said window, a radiation-sensitive layer formed on the surface of the end wall of said inner tubular shell adjacent said window, electrodes connecting with said layer, leads affording connection between said electrodes and contacts outside said envelope, and a mirror surface layer covering the inner surface of said outer tubular shell over a region extending from the boundaries of said window towards said closure at least beyond the surface supporting said radiation-sensitive layer, the end wall of said inner tubular shell comprising a supporting surface for said layer and a shield wall surrounding said supporting surface and protruding therefrom towards said window.

6. Radiation-sensitive cell comprising an envelope having an outer tubular shell closed at one end by a window transparent to radiations in the infra-red wavelength region, an inner tubular shell lying within and spaced from said outer tubular shell and closed at the end adjacent to said window by an end wall and a closure sealing the annular space between the ends of said shells remote from said window, a radiation-sensitive layer formed on the surface of the end wall of said inner tubular shell adjacent said window, electrodes connecting with said layer, leads affording connection between said electrodes and contacts outside said envelope, a mirror surface layer covering the inner surface of said outer tubular shell over a region extending from the boundaries of said window towards said closure at least beyond the surface supporting said radiation-sensitive layer the end wall of said inner tubular shell comprising a supporting surface for said layer and a beading formed on said end wall around said supporting surface, protuberant towards said window.

7. Radiation-sensitve cell comprising an envelope having an outer tubular shell closed at one end by a window transparent to radiations in the infra-red wavelength region, an inner tubular shell lying within and spaced from said outer tubular shell and closed at the end adjacent to said window by an end wall and a closure sealing the annular space between the ends of said shells remote from said window, a radiation-sensitive layer formed on the surface of the end wall of said inner tubular shell adjacent said window, electrodes connecting with said layer, leads affording connection between said electrodes and contacts outside said envelope, and a mirror surface layer covering the inner surface of said outer tubular shell over a region extending from the boundaries of said window towards said closure at least beyond the surface supporting said radiation-sensitive layer the end wall of said inner tubular shell being provided with a central indentation on the recessed surface of which said radiation-sensitive layer is formed.

8. A radiation sensitive cell comprising an envelope having a first region of its walls formed as a window transparent to radiations at infrared wave lengths, a second region of its walls extending away from the boundaries of said first region and a third region of its walls supporting a radiation sensitive layer disposed directly on the wall surface and facing said window, and shielding means disposed in the optical path between said layer and said second region of the envelope walls to limit radiation reaching said third region substantially to radiation passing through said window.

9. A radiation sensitive cell according to claim 8 in which said shielding means comprises a radiation reducing layer covering the surface of said second region.

10. A radiation sensitive cell according to claim 9 in which said radiation reducing layer has high radiation reflecting properties.

11. A radiation sensitive cell according to claim 8 in which said shielding means comprises wall means surrounding said radiation sensitive layer and having an opening facing toward said window, whereby said wall means intercepts a substantial portion of the radiation approaching said layer other than through said window.

12. A radiation sensitive cell comprising an envelope having an outer tubular shell, an end portion of which comprises a window transparent to radiations in the infra red wave length region, an inner tubular shell lying within and spaced from said outer tubular shell and closed at the end adjacent to said window, a sealed connection between the ends of said shells remote from said window, a radiation sensitive layer formed on the end surface of the inner tubular shell adjacent said window, and shielding means disposed relative to said layer so as to limit the radiation reaching said layer substantially to that passing through said window.

ALAN F. GIBSON.

REFERENCES CITED

The following references are of record in the file of this patent:

UNITED STATES PATENTS

| Number | Name | Date |
|---|---|---|
| 1,568,694 | Ruggles | Jan. 5, 1926 |
| 1,935,698 | Decker et al. | Nov. 21, 1933 |